Sept. 15, 1970 F. C. BUMB, JR 3,528,626

TAPE TRANSPORT APPARATUS WITH DRIVEN TAPE ROLL MEANS

Filed Nov. 13, 1968 4 Sheets-Sheet 1

INVENTOR.
FRANK C. BUMB, JR.
BY White & Haefliger
ATTORNEYS.

INVENTOR.
FRANK C. BUMB, JR.
BY White & Haefliger
ATTORNEYS.

Sept. 15, 1970 F. C. BUMB, JR 3,528,626

TAPE TRANSPORT APPARATUS WITH DRIVEN TAPE ROLL MEANS

Filed Nov. 13, 1968 4 Sheets-Sheet 3

INVENTOR.
FRANK C. BUMB, JR.
By White & Haefliger
ATTORNEYS.

INVENTOR
FRANK C. BUMB, JR.
By White & Haefliger
ATTORNEYS.

United States Patent Office 3,528,626

Patented Sept. 15, 1970

3,528,626

TAPE TRANSPORT APPARATUS WITH DRIVEN TAPE ROLL MEANS

Frank C. Bumb, Jr., 8424 E. Longden Ave., San Gabriel, Calif. 91775

Filed Nov. 13, 1968, Ser. No. 788,110

Int. Cl. G03b *1/04;* G11b *15/32*

U.S. Cl. 242—192 22 Claims

ABSTRACT OF THE DISCLOSURE

The disclosure concerns unusually advantageous tape roll mounting and driving means in a tape transport system wherein both the supply and takeup rolls of tape are separately peripherally driven by separate rotors having differential surface velocities.

BACKGROUND OF THE INVENTION

This invention relates generally to web or tape transport equipment. More specifically, it has to do with improvements in systems wherein information bearing tape is transported between supply and takeup rolls in response to drive means frictional engagement with the tape itself.

It has been conventional in the past to effect transport of magnetic or paper tape between rolls or packs on supply and takeup reels either by driving the reels themselves, or by driving a belt in peripheral engagement with the tape rolls. Reel drive systems have required the use of rather complex equipment, as for example constant tension servos, etc., to obtain the desired reel motion characteristics, one or two capstans being used to provide tape velocity control. As an example certain applications require low flutter, constant tape velocity and constant tape tension, analog systems using frequency modulation and direct recording being illustrative. Tape engaging belt drive systems, while satisfactory for many purposes, present problems of belt life and slippage and pack handling, especially in response to extremely fast accelerations and high speed conditions characteristic of digital and video recording and playback apparatus.

Quite recently, an effort made to resolve such problems has resulted in a concept wherein the tape supply and takeup rolls are both peripherally driven by means of a single capstan; however, while offering certain advantages, such a system does not satisfactorily overcome the problem of susceptibility of tape velocity and tension to vibrational disturbances occurring in operational environments. Also, such a system lacks desired flexibility in the arrangement and mounting of the transducer heads; it is not well adapted to bidirectional transporting of the tape; introduction and use of compliance in the drive becomes very difficult to achieve with simplicity (such compliance being useful in certain fast start and stop transports, as in digital transports); and the forces exerted between the tape packs or rolls and single capstan must be so constrained as to be unequal.

SUMMARY OF THE INVENTION

The present invention overcomes these and other problems associated with prior systems through the provision of improvements in an unusually effective and simple tape transport assembly as disclosed in my copending application entitled, "Tape Transport Assembly With Driven Tape Roll Means," Ser. No. 773,381, filed Nov. 5, 1968. As there described, the assembly comprises a pair of carriers for tape to be transported from a supply roll on one carrier to a takeup roll on the other carrier; a pair of rotors located to engage with pressure the tape rolls on the respective carriers for effecting rotation of the rolls on the carriers in order to accomplish the transport; and means to drive the rotors at angular velocities characterized in that the tape extent undergoing transportation between the supply roll and takeup roll is maintained in tension. As will be seen, the drive rotors may or may not be coaxial. Also, the tape may comprise metal or paper tape as well as magnetic tape, and also photographic film.

It is a major object of the present invention to provide means exerting forces operable to maintain pressural engagements of the tape rolls with the respective rotors, such means taking the form of swingable arms mounting the carriers, together with yieldable biasing means operatively connected with such arms.

It is another object of the present invention to provide an unusually simple means for bidirectionally driving the basic transport system of my prior application, thereby permitting quick reversing without need for reversing the forces transmitted via tape rolls.

It is a further object of the invention to provide means to receive and yieldably deflect the tensioned tape extent undergoing transportation between the rolls of the basic system disclosed in my prior application, whereby compliance may be introduced in an unusually simple and effective manner. Compliance may also be introduced in the drive to the rotors, as will be seen. Such compliance facilitates simplified design of fast start-stop transports for digital applications.

It is another object of the invention to provide rotor drive means comprising a motor, a belt driven by the motor, and a pair of drive wheels driven by the belt and operable to rotate the respective rotors of the basic system referred to above.

It is still another object of the invention to provide novel means for stacking and driving multiple assemblies, each of which embodies a basic system as referred to above, with multiple cartridges enclosing such assemblies, and the rotors selectively and individually activated.

It is still another object of the invention to provide means to brake the tape rolls and to be releasable in response to rotor pressurization of the rolls, as during unidirectional insertion of a tape roll containing cartridge into operative relation with transducer head structure.

It is still another object of the invention to provide a compressible annulus on the drive rotors to peripherally engage the tape roll, there being structure on the rotors to resist circumferential elongation of the annulus during external vibration application.

Finally, it is an object of the invention to incorporate the advantages of the tape drive as described in my prior application in a system wherein only one tape roll is carried in the cartridge which releasably connects to apparatus operable to drive the tape from that roll onto a takeup roll, the supply roll also being peripherally driven or restrained against rotation, as will be described.

These and other objects and advantages of the invention as well as the details of illustrative embodiments, will be more fully understood from the following detailed description of the drawings, in which:

DRAWING DESCRIPTION

Figure 9:
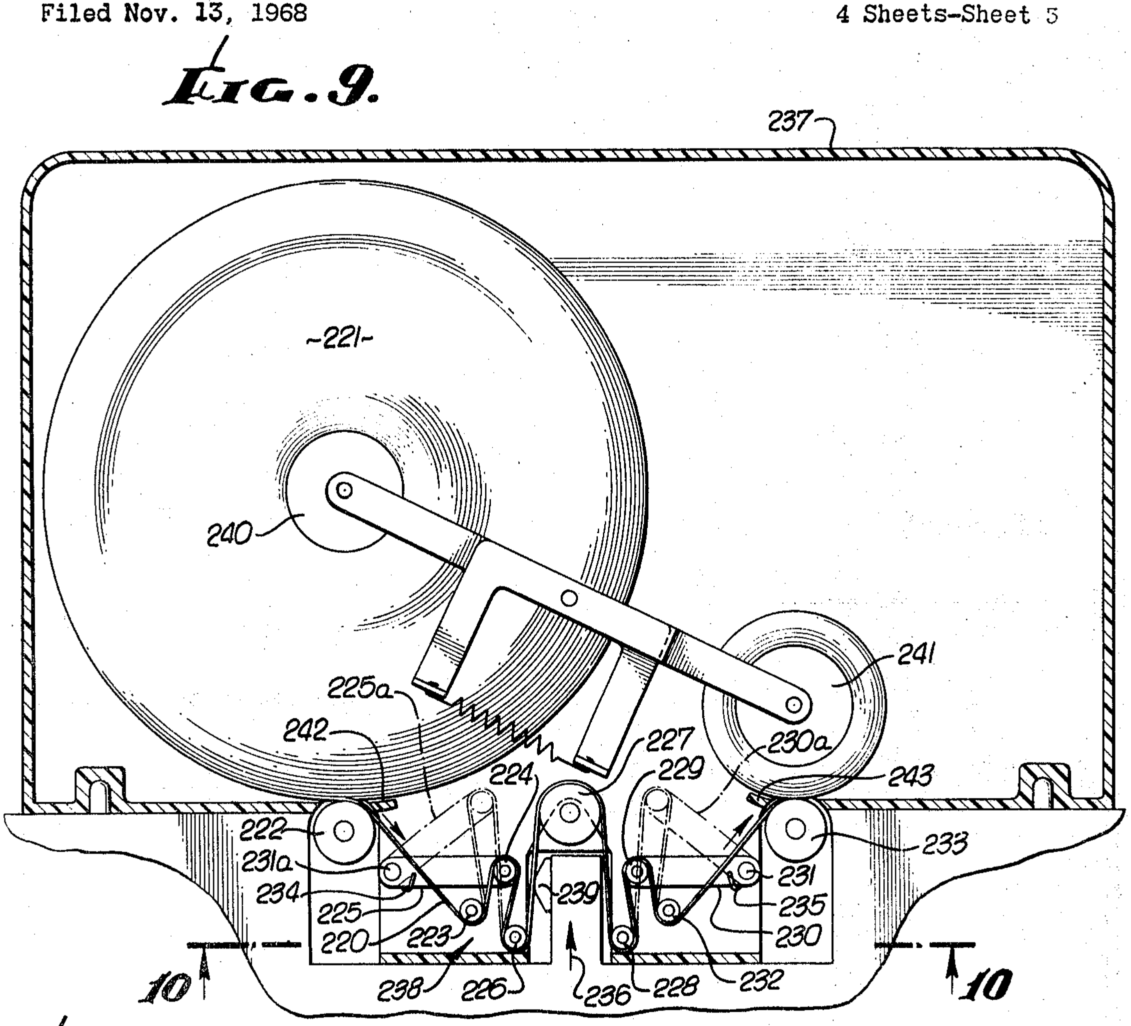
FIG. 9 is a plan view schematic showing of a transport assembly employing separate rotor peripheral drive of two tape rolls, in which a compliant tape buffer is provided.
Figure 10:
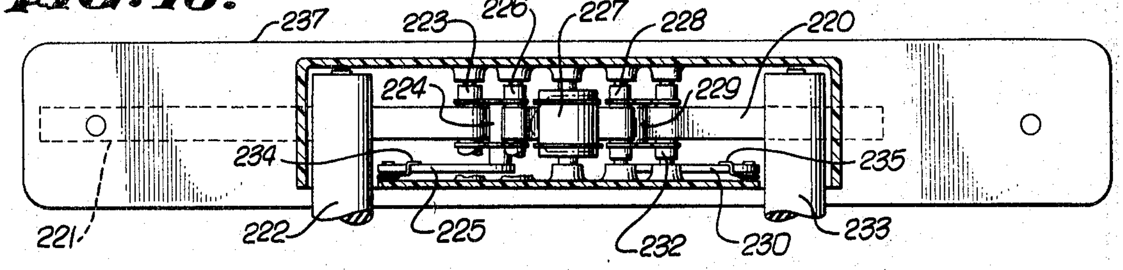
FIG. 10 is a view taken on line 10—10 of FIG. 9.
Figure 10A:
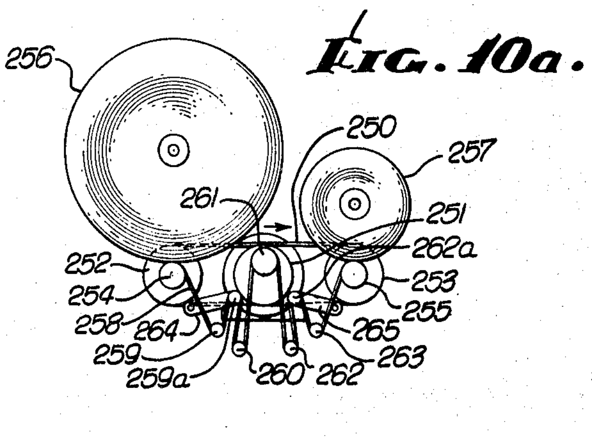
Figure 11:
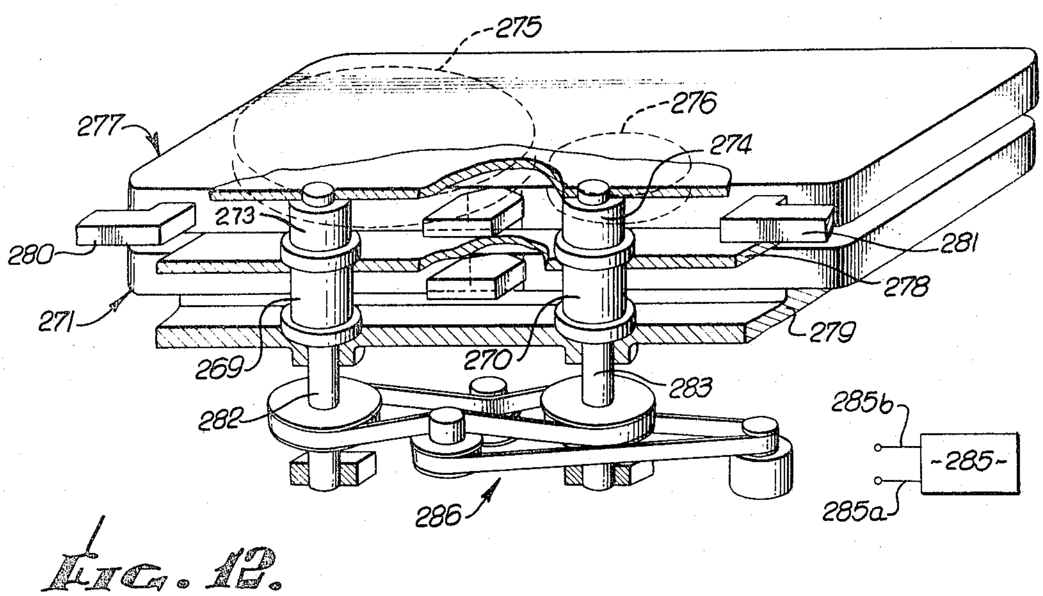
Figures 12, 13:
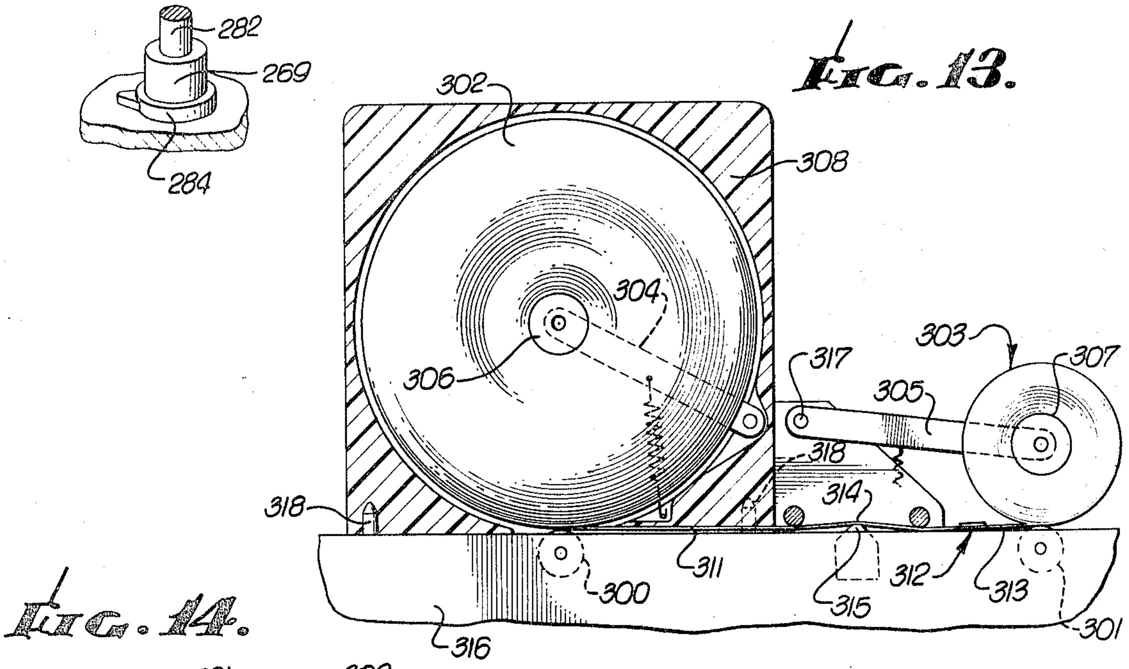
Figure 14:
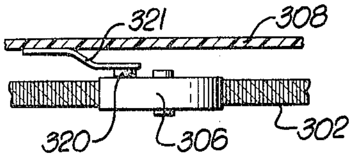

FIG. 10*a* is a schematic variational form of the FIGS. 9 and 10 assembly employing a compliant drive;

FIG. 11 is a schematic perspective showing of a system having a single transport assembly incorporating stacked cartridges, the tape rolls being rotor driven;

FIG. 12 is a perspective showing of a drive rotor clutching and declutching arrangement, usable in the FIG. 11 system;

FIG. 13 is a schematic plan view showing of a peripherally driven tape transport assembly, wherein the cartridge is associated with only one tape roll; and FIG. 14 is a schematic showing of a means to restrain rotation of the supply roll in FIG. 13.

DESCRIPTION OF PREFERRED EMBODIMENTS

Figure 1:
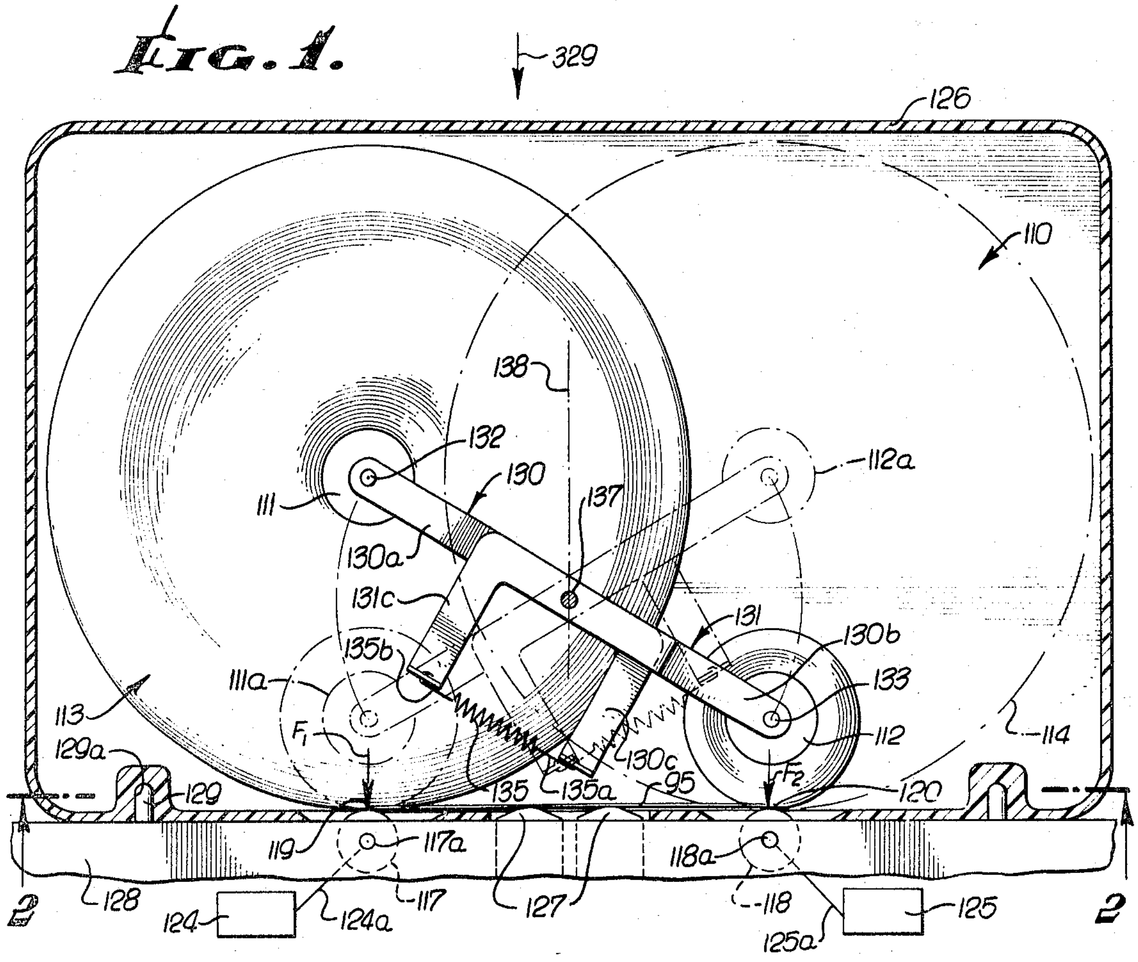
FIG. 1 is a schematic plan view of a tape transport assembly showing arm structure exerting forces on the tape carriers to effect forcible engagement of the tape rolls with drive rotors.
Figure 2:
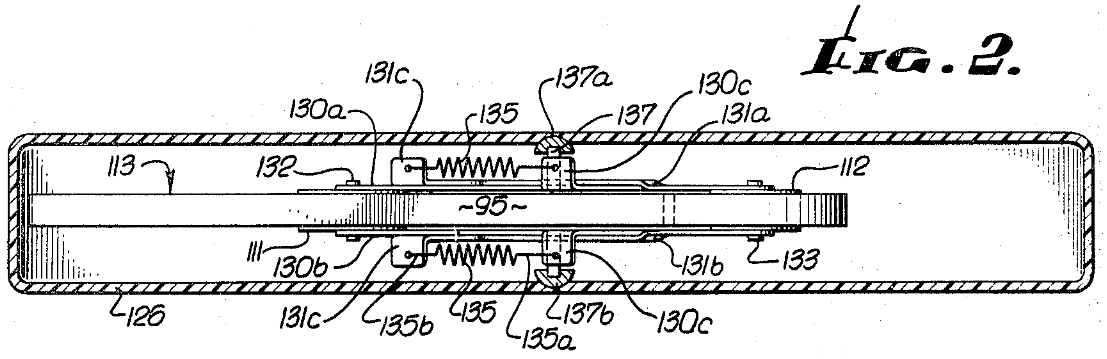
FIG. 2 is a view taken on line 2—2 of FIG. 1.

Referring first to FIGS. 1 and 2, they show a tape transport assembly 110, incorporating the basic drive as disclosed in my prior and copending application for U.S. Letters Patent Ser. No. 773,381 filed Nov. 5, 1968, and entitled, "Tape Transport Assembly with Driven Tape Roll Means." It includes a pair of carriers, or flangeless reels, 111 and 112 for tape to be transported from a supply roll 113 on one carrier 111 to a takeup roll on the other carrier 112. When full, the roll on carrier 12 has the outline shown in broken lines 114. The carriers are freely rotatable on mounts in the form of swingable arms 130 and 131.

The assembly also includes a pair of rotors 117 and 118 located to engage with pressure the tape rolls on the respective carriers for effecting rotation of the rolls on the carriers in order to accomplish tape transport. Thus, rotor 117 has pressural engagement with the tape roll on carrier 111 at location 119, and rotor 118 has pressure engagement with the tape roll on carrier 112, at location 120. Such engagement is indicated by the forces $F_1$ and $F_2$ acting at the respective locations 119 and 120, and it will be understood that equal and opposite forces exist at each of such locations, whereby the tape rolls may be urged toward the rotors or vice versa, to achieve such force applications at those locations.

The force exerting means operable to maintain such pressure engagements of the tape rolls with the rotors may be considered to include structure having the swingable arms 130 and 131 mounting the carriers. In the example, such arms include sections at **130*a* and 130*b* and 131*a* and 131*b*. The former pair carry the spindle 132 on which carrier 111 freely rotates and the latter sections 131*a* and 131*b* carry spindle 133 on which carrier 112** freely rotates.

The force exerting means also includes yieldable biasing means operatively connected with the arms, such biasing means in the example taking the form of a compression spring 135 having opposite end portions **135*a* and 135*b*. The former is connected to extension 130*c* of arm structure 130 which mounts carrier 111; and spring end portion 135*b* is connected to extension 131*c* of arm structure 131 which mounts carrier 112. Note that the arm structures have a common central pivot 137 at the central plane 138, enabling independent rocking of the arms as tape is transported between the supply and takeup rolls. During such rocking, the spring 135 continues to exert substantially the same force as the carriers 111 and 112, whereby the forces $F_1$ and $F_2$ remain substantially the same. Further, during such rocking the supply carrier is moved from solid line position 111 to broken line position 111*a* as tape unwinds off the carrier; and takeup carrier 112 is moved from solid line position 112 to broken line position 112*a*** as tape winds onto that carrier. Upon reversing, roles of the carriers are, of course, reversed.

As disclosed in my prior application referred to above, the assembly also includes means to drive the rotors at angular velocities characterized in that the tape extent 95 undergoing transportation between the supply roll and takeup roll is maintained in tension. Such tension may be maintained nearly independently of the magnitude of the forces $F_1$ and $F_2$ whereby they may be equal or unequal, and vary in magnitude, so long as a condition of nonslip is maintained as between the rotors and tape rolls. Merely as illustrative, the rotor drive means includes shafts **117*a* and 118*a* and suitable drive mechanism indicated at 124 and 125 as having operative connection at 124*a* and 125*a*** with those respective shafts. Such mechanism may include a suitable motor or motors and belting. Useful motor drive techniques include the use of variable speed drives, incremental drives, D.C. servos, A.C. servos and hysteresis synchronous motors.

A cartridge housing for the tape rolls, carriers and arms is seen at 126. Note in this regard that the cartridge supports the pivot or pin 137 at bearing locations **137*a* and 137*b* in FIG. 2. On the other hand, the rotors 117 and 118 and the transducing (read/write) heads 127 for the magnetic tape are on the mounting structure 128, and the cartridge 126 is designed to be advanced unidirectionally in the direction of arrow 329 into the position shown. In that position, the rotors pressurally engage the tape rolls, and the structure 128 mounts the cartridge 126, as via the locating pins 129 received in registration holes 129*a*** in the cartridge.

As brought out in my prior application referred to, for there to be tension in the tape undergoing transportation between the tape rolls, the rotors 117 and 118 must have tape engaging surfaces characterized in that the velocity $V_2$ of the rotor surface engaging the takeup roll exceeds the velocity $V_1$ of the rotor surface engaging the supply roll. In general, this velocity difference $V_2-V_1$ is made nearly independent of $F_1$ and $F_2$, is a function of the physical parameters of the tape, desired tape tension, and the shear deflection of the surface of rotors 117 and 118, and for practical magnetic recording tape this difference will be small, i.e., less than 3% and usually on the order of ½% of $V_1$ and $V_2$.

Figure 3:
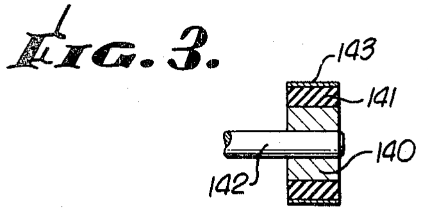
FIG. 3 is a section taken through a modified rotor.

FIG. 3 illustrates an alternate rotor construction having a non-compliant central hub 140, and a compliant or somewhat compressible annulus 141 attached to the hub, the rotor shaft being indicated at 142. Annulus 141 may consist of elastic material such as a suitable plastic or hard rubber. Also shown is the provision of an element, such as a thin annulus of metal 143 on the annulus 141, or higher modulus material than the annulus 141.

Figure 4:
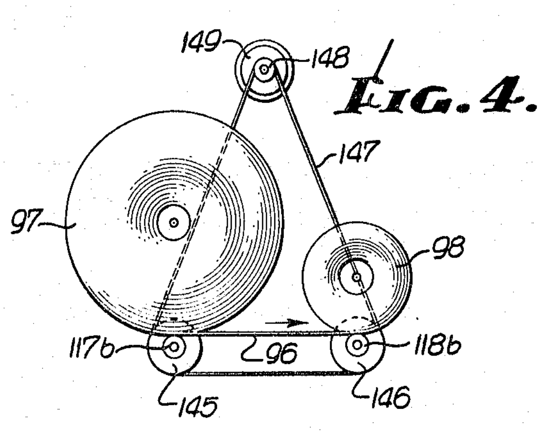
FIGS. 4 and 5 are schematic showings of rotor drive mechanisms.
Figure 5:
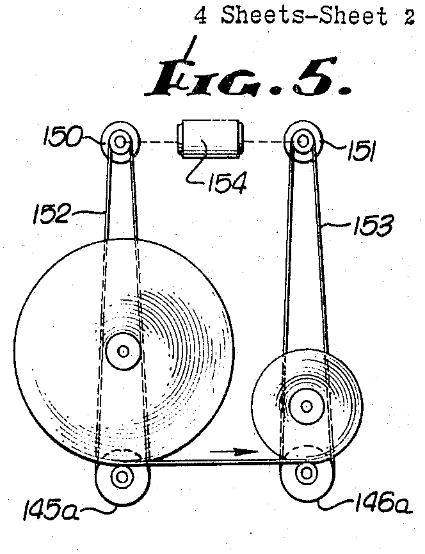

Turning now to FIG. 4, rotor drive shafts are shown **117*b* and 118*b* as respectively integral with drive wheels 145 and 146. A belt 147 engages the drive wheels and shaft 148 of a drive motor 149. The differential in peripheral velocities $V_2$ and $V_1$ of the rotors 117 and 118 is here created by forming the belt engaging diameter of wheel 146 slightly smaller than the belt engaging diameter of wheel 145. The belt 147 may be substantially inelastic (as is characteristic of Mylar, for example) or it can be somewhat elastic or compliant (as is characteristic of rubber or polyurethene). If the belt is elastic, the difference in the diameters of wheels 145 and 146 should be increased in order to maintain the same tension on the tape 96 being transported between the supply and takeup rolls 97 and 98. FIG. 5 illustrates the use of two motors 150 and 151 instead of a single motor. Belts 152 and 153 transmit drive from the motors to the equal diameter drive wheels 145*a* and 146*a*. A motor relative speed control is indicated at 154**, with connection to the two motors, and the latter may be reversed with appropriate speed control to create proper tape tension in reverse mode.

Figure 6:
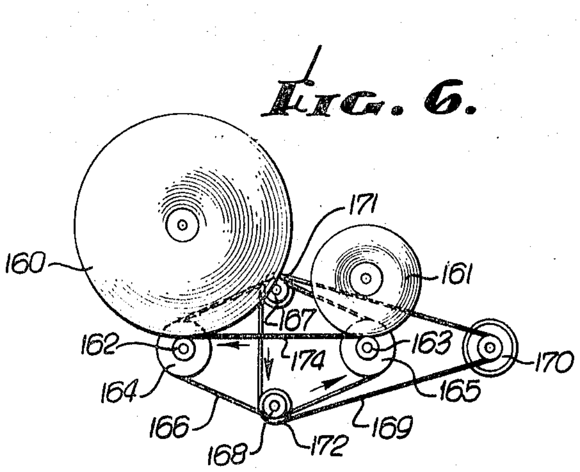
FIG. 6 is a schematic showing of drive mechanism operable to advance the tape of FIG. 1 under tension, forwardly and reversely.

Another bidirectional drive is seen in FIG. 6, wherein tape rolls 160 and 161 are peripherally driven by rotors 162 and 163. Drive wheels 164 and 165 for the rotors 162 and 163 are driven by a belt 166, which also engages idlers 167 and 168. A second belt 169, driven by motor 170, engages wheels 171 and 172 integral with idlers 167 and 168. Belt 169 is compliant so that the peripheral velocity of idler 168 is slightly faster than the peripheral velocity of 167 for the belt direction of travel as shown; as a result, the peripheral velocity of rotor 162 (driving tape roll 160 in takeup mode) is slightly larger than the peripheral velocity of rotor 163 (driving tape roll 161 in supply mode), whereby the tape traveling leftward at 174 is tensioned. The conditions are reversed for rightward tape travel upon reversing of the motor.

Figure 8:
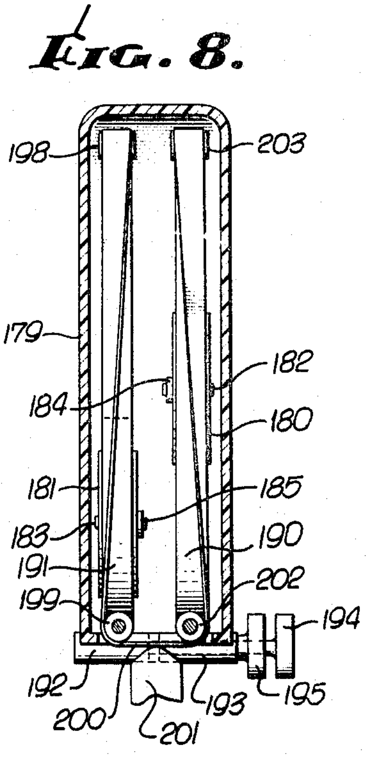
FIG. 8 is a view taken on line 8—8 of FIG. 7.
Figure 7:
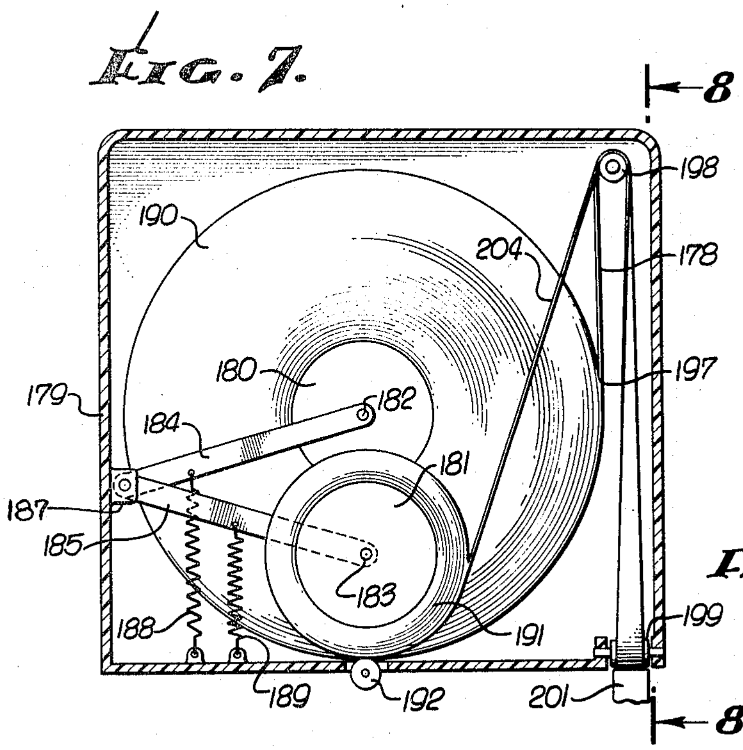
FIG. 7 is a schematic plan view showing of a transport assembly wherein the rotor drtven tape rolls are mounted coaxially.

FIG. 7 illustrates the adaptation of the peripherally driven tape rolls to a coaxial substantially drive rotor configuration. As seen, tape roll carriers 180 and 181 freely rotate on pins or axles 182 and 183 on arms 184 and 185 pivotally carried by cartridge structure 179 at 187 to move in parallel planes, whereby the rolls are contained within such structure. Springs 188 and 189 individually bias the arms in a direction urging the tape rolls 190 and 191 on the carriers toward the drive rotors 192 and 193. FIG. 8 shows the manner in which rotor 192 is driven by drive wheel 194, the shaft of which passes coaxially through the shaft of drive wheel 195 driving rotor 193. Wheels 194 and 195 are rotated in opposite directions.

As tape 178 leaves roll 190 at 197, it passes over idler 198 and undergoes a quarter turn as it travels to idler 199. From the latter, it passes at 200 adjacent a read-write head or heads 201, and then to idler 202. From the latter the tape undergoes a quarter turn as it travels to idler 203, from which the tape passes at 204 to tape roll 191.

A further aspect of the invention involves the provision of means to receive and yieldably deflect the tensioned tape extent undergoing travel between the supply and take-up rolls. The basic objective for the use of such compliance is to provide decoupling or buffering between the motion of the tape adjacent the tape rolls and points of tape travel between these rolls, and decoupling of drive rotors by elastic belts or buffer structure. Instances in which such buffering would be advantageous would be those where fast start and stop operation is required.

In the example seen in FIGS. 9 and 10, the tape 220 leaves supply roll 221 proximate the drive rotor 222 and passes to idler 223; from the latter it travels to idler 224 on a swingable arm 225 pivoted at **231*a*. After passing around idler 224 the tape is directed to idler 226 from which it passes to capstan 227. Leaving the latter, the tape passes to idler 228, thence to idler 229 on swingable arm 230 pivoted at 231, and then to idler 232 and to the takeup roll adjacent drive rotor 233. As better seen in FIG. 10, compliant coil springs 234 and 235 respectively bias the arms 225 and 230 toward the broken line positions 225*a* and 230*a* they assume before the capstan is thrust in the direction of arrow 236 into the position shown at the time the cartridge 237 is connected to the recording or playback structure 238. During such "insertion" of the cartridge, the read/write head 239, also on structure 238**, is thrust into the solid line position shown, and the tape remains taut.

During operation, and in the event of a fast startup, the inertia of the supply roll 221 becomes initially substantially decoupled from the rightward accelerating motion of the tape being wound on the takeup roll because the arms 225 and 230 pivot downwardly to allow the "stored" tape extents between the idlers to supply the initial need for tape travel. The capstan 227 is typically driven at a peripheral velocity $V_3$ intermediate the peripheral velocity $V_2$ of drive rotor 233 and the peripheral velocity $V_1$ of drive rotor 222 so that $V_2>V_3>V_1$. Carriers for the tape rolls are seen at 240 and 241, and the carriers may be urged toward the drive rotors in the manner as described in FIGS. 1 and 2. The cartridge 237 mounts the idlers 223, 226, 228 and 229, as well as the pivots 231 and **231*a*. Cartridge shoulders 242 and 243 press against and thereby brake the tape rolls until such time as the drive rotors 222 and 233 press against such rolls in response to cartridge insertion, unidirectionally and oppositely from the direction of arrow 236**.

In FIGS. 9 and 10, the compliant element comprises a spring and has the function of yieldably deflecting, temporarily, in response to sudden acceleration of the motor. Another such element having the same function is seen in FIG. 10*a* to comprise the elastic belt 250 which is driven by a motor rotor 251, and which drives the wheels 252 and 253 driving the rotors 254 and 255. The latter peripherally and pressurally engage the tape rolls 256 and 257. The tape 258 leaves roll 256 and turns about idlers 259, **259*a* and 260, after which it engages the motor driven capstan 261 corresponding to capstan 227 in FIG. 9. From capstan 261 the tape turns about idlers 262, 262*a* and 263 and joins the tape roll 257. Idlers 259*a* and 263 may be arm supported and resiliently biased as in FIG. 9. In view of the belt compliance and tape buffering provided by spring urged arms 264 and 265, the inertial loads seen by motor 251** are substantially reduced, enabling faster acceleration-deceleration of the motor, which is useful in fast start-stop applications and incremental machines.

Turning now to FIGS. 11 and 12, a first pair of rotors 269 and 270 is provided to peripherally engage tape rolls in a first cartridge 271, in the manner described in FIG. 1; and a second pair of rotors 273 and 274 is provided to peripherally engage similar tape rolls 275 and 276 in a second cartridge 277. The latter has stacked relationship to cartridge 271, as afforded by frame or support structure 278 and 279, there being indexing elements 280 and 281 to locate the cartridge 277 relative to the frame. Note also that the rotors 269, 270, 273 and 274 have fixed position relative to the frame.

Rotors 269 and 273 are coaxial and are driven by a common drive shaft 282; similarly rotors 270 and 274 are driven by a common shaft 283. Each rotor has associated therewith a clutch element, as better seen at 284 in FIG. 12, and characterized in that it may be individually electrically energized to clutch the rotor to its shaft to enable transmission of drive to the tape roll pressurally engaged by that rotor. A control is shown at 285 in FIG. 11 as having one output at **285*a* to the clutches associated with rotors 269 and 270, and another output at 285*b* to the clutches associated with rotors 273 and 274. Therefore, means is provided for selectively and individually driving the rotor pairs associated with the different cartridges in the stack to drive the tape rolls in those cartridges in the manner as described in FIG. 1. A motor and belt drive for the shafts 282 and 283 is seen at 286**, and may take the form of that described in FIG. 6.

The system seen in FIG. 13 is basically the same as described in FIG. 1, with drive rotors 300 and 301 peripherally engaging the tape rolls 302 and 303. Note the spring urged arms 304 and 305 for the tape roll carriers 306 and 307. In this case, however, one roll 302 is contained by the cartridge. The tape leader 311 connected to tape in roll 302 is suitably releasably connected at 312 to a tape leader 313 wound on carrier 307 and the tape is adapted to be wound on carrier 307 in response to rotation of the rotors 300 and 301. Note the transducer head 315 engaging the tape at 314. Frame structure 316 supports rotors 300 and 301 as well as carrier 307 and the pivot 317 for arm 305. Supply cartridge 308 suitably connects to the frame at pin locations 318.

If desired, the rotor 300 may be omitted, and frictional drag means used to inhibit rotation of the carrier 302, in response to drive of the rotor 301, thereby to create the necessary tension in the tape being transported past the head 313. One such drag means is shown in FIG. 14 in the form of a friction pad 320 pressed against the side of the carrier 306 by a flat spring 321 mounted to the cartridge 308.

I claim:

1. In a tape transport assembly, a pair of carriers for tape to be transported from a supply roll on one carrier to a takeup roll on the other carrier, a pair of rotors located to engage with pressure the tape rolls on the respective carriers for effecting rotation of the rolls on the carriers in order to accomplish said transport, means exerting forces operable to maintain said pressural engagements of the tape rolls with the respective rotors, and means to drive the rotors at differential surface velocities characterized in that the tape extent undergoing transportation between the supply roll and the takeup roll is maintained in tension, said force exerting means including structure having swingable arms mounting the carriers.

2. The assembly of claim 1 wherein said force exerting means includes yieldable biasing means operatively connected with said arms.

3. The assembly of claim 2 wherein said yieldable biasing means comprises a spring having opposite end portions one of which is operatively connected to one arm mounting one carrier and the other of which is operatively connected to another arm mounting the other carrier.

4. In a tape transport assembly, a pair of carriers for tape to be transported from a supply roll on one carrier to a takeup roll on the other carrier, a pair of rotors located to engage with pressure the tape rolls on the respective carriers for effecting rotation of the rolls on the carriers in order to accomplish said transport, means exerting forces operable to maintain said pressural engagements of the tape rolls with the respective rotors, and means to drive the rotors at differential surface velocities characterized in that the tape extent undergoing transportation between the supply roll and the takeup roll is maintained in tension, at least one of said rotors having a compressible annular portion defining said tape engaging surface, and said one rotor including an element resisting variable circumferential deformation of said compressible annular portion which is out of engagement with the tape during said tape transport.

5. In a tape transport assembly, a pair of carriers for tape to be transported from a supply roll on one carrier to a takeup roll on the other carrier, a pair of rotors located to engage with pressure the tape rolls on the respective carriers for effecting rotation of the rolls on the carriers in order to accomplish said transport, means exerting forces operable to maintain said pressural engagements of the tape rolls with the respective rotors, and means to drive the rotors at differential surface velocities characterized in that the tape extent undergoing transportation between the supply roll and the takeup roll is maintained in tension, said rotor drive means comprising a motor, a belt driven by the motor, and a pair of drive wheels driven by the belt and operable to rotate the respective rotors.

6. In a tape transport assembly, a pair of carriers for tape to be transported from a supply roll on one carrier to a takeup roll on the other carrier, a pair of rotors located to engage with pressure the tape rolls on the respective carriers for effecting rotation of the rolls on the carriers in order to accomplish said transport, means exerting forces operable to maintain said pressural engagements of the tape rolls with the respective rotors, and means to drive the rotors at differential surface velocities characterized in that the tape extent undergoing transportation between the supply roll and the takeup roll is maintained in tension, said rotor drive means comprising a pair of motors, and a pair of drive wheels driven by the respective motors and operable to rotate the respective rotors.

7. In a tape transport assembly, a pair of carriers for tape to be transported from a supply roll on one carrier to a takeup roll on the other carrier, a pair of rotors located to engage with pressure the tape rolls on the respective carriers for effecting rotation of the rolls on the carriers in order to accomplish said transport, means exerting forces operable to maintain said pressural engagements of the tape rolls with the respective rotors, and means to drive the rotors at differential surface velocities characterized in that the tape extent undergoing transportation between the supply roll and the takeup roll is maintained in tension, said rotor drive means including a pair of drive wheels operable to rotate the respective rotors, and wheel drive structure including endless belting subject to selective advancement in opposite directions at different speeds for rotating said respective wheels and rotors to advance the tape under tension forwardly or reversely with respect to said rolls.

8. In a tape transport assembly, a pair of carriers mounted in substantially parallel planes for tape to be transported from a supply roll on one carrier to a takeup roll on the other carrier, a pair of substantially coaxial rotors located to engage with pressure the tape rolls on the respective carriers for effecting rotation of the rolls on the carriers in order to accomplish said transport, and means to drive the rotors at different surface velocities characterized in that the tape extent undergoing transportation between the supply roll and the takeup roll is maintained in tension.

9. The assembly according to claim 1 including a cartridge mounting and containing said carriers.

10. The assembly according to claim 1 including means to receive and yieldably deflect the tensioned tape extent undergoing travel between said rolls.

11. The assembly of claim 10 wherein said means to yieldably deflect the tape comprises a spring urged element movable between positions corresponding to varying degrees of tape deflection.

12. The assembly of claim 10 including a rotary capstan for driving engagement with the tape in spaced relation to said tape roll engaging rotors, said means to yieldably deflect the tape including spring urged elements engageable with the tape between said rotary capstan and each of said rotors.

13. The assembly according to claim 7 wherein said rotor drive means includes a motor, and a compliant element adapted to yieldably deflect temporarily in response to sudden acceleration of said motor.

14. The assembly of claim 13 wherein said complaint element comprises a belt.

15. The assembly of claim 13 wherein said compliant element comprises a spring.

16. The assembly of claim 1 including a second pair of carriers and a second pair of rotors as defined, said rotor drive means also driving the second pair of rotors.

17. The assembly of claim 16 including a cartridge mounting the first mentioned carriers, and a second cartridge mounting the second pair of carriers, said cartridges extending in stacked relation.

18. The assembly of claim 17 wherein the rotor drive means includes structure for selectively and individually activating certain of said rotors to drive said rolls.

19. The assembly of claim 1 including means to brake the tape rolls on the carriers and to be releasable in response to rotor pressurization of said rolls.

20. The assembly of claim 19 wherein cartridge structure mounts the carriers and braking means so as to be unidirectionally movable toward the rotors to effect said pressurization.

21. The assembly of claim 16 including a cartridge mounting and containing only one of the carriers of a given pair.

22. The assembly of claim 21 including other structure mounting the other of the carriers of said pair and adapted to removably support said cartridge, and including said tape in a roll on said one carrier and means releasably connecting the tape with the other carrier.

References Cited

UNITED STATES PATENTS

| | | | |
|---|---|---|---|
| 2,457,699 | 12/1948 | Marsen | 179—100.2 |
| 2,804,508 | 8/1957 | Mastling et al. | 179—100.2 |
| 3,077,315 | 2/1963 | Draheim et al. | 242—192 X |
| 3,291,409 | 12/1966 | McClellan | 242—192 X |
| 3,460,781 | 8/1969 | Uber | 242—202 X |

LEONARD D. CHRISTIAN, Primary Examiner

U.S. Cl. X.R.

242—65, 197